(12) United States Patent
Yang

(10) Patent No.: US 7,948,703 B1
(45) Date of Patent: May 24, 2011

(54) ADAPTIVE TARGET OPTIMIZATION METHODS AND SYSTEMS FOR NOISE WHITENING BASED VITERBI DETECTORS

(75) Inventor: Xueshi Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 205 days.

(21) Appl. No.: 12/356,391

(22) Filed: Jan. 20, 2009

Related U.S. Application Data

(60) Provisional application No. 61/024,700, filed on Jan. 30, 2008.

(51) Int. Cl.
*G11B 5/02* (2006.01)
(52) U.S. Cl. .......................................................... 360/68
(58) Field of Classification Search .................. 360/68, 360/39, 53, 46, 65, 66, 67; 375/144, 147, 375/232, 233; 708/322; 706/13
See application file for complete search history.

(56) References Cited

U.S. PATENT DOCUMENTS

| | | | | |
|---|---|---|---|---|
| 5,060,088 A | * | 10/1991 | Dolivo et al. | 360/46 |
| 5,422,760 A | * | 6/1995 | Abbott et al. | 360/46 |
| 5,430,661 A | * | 7/1995 | Fisher et al. | 375/233 |
| 5,543,978 A | * | 8/1996 | Park | 360/65 |
| 5,677,801 A | * | 10/1997 | Fukuchi et al. | 360/46 |
| 5,781,699 A | * | 7/1998 | Dittmar et al. | 706/13 |
| 6,144,951 A | * | 11/2000 | Dittmar et al. | 706/13 |
| 6,522,683 B1 | * | 2/2003 | Smee et al. | 375/144 |
| 6,804,695 B1 | * | 10/2004 | Hsu | 708/322 |
| 7,035,316 B2 | * | 4/2006 | Smee et al. | 375/147 |
| 7,050,491 B2 | * | 5/2006 | McDonald et al. | 375/232 |
| 7,256,954 B2 | * | 8/2007 | Serizawa | 360/65 |
| 7,271,971 B2 | * | 9/2007 | Hutchins et al. | 360/65 |
| 7,639,444 B2 | * | 12/2009 | Hutchins et al. | 360/53 |
| 2008/0253011 A1 | * | 10/2008 | Mouri et al. | 360/39 |

OTHER PUBLICATIONS

Lim, Sze Chieh et al., "Convergence Analysis of Constrained Joint Adaptation in Recording Channels," IEEE Transactions on Signal Processing, vol. 54, No. 1, pp. 95-104, (Jan. 2006).

* cited by examiner

*Primary Examiner* — Fred Tzeng

(57) ABSTRACT

Apparatuses and methods are provided for adaptively updating a target for a recording channel, such as a magnetic recording channel. In some embodiments, a read channel apparatus is provided which includes data path modules and adaptive path modules. The data path modules estimate user information from a recording channel, and the adaptive path modules adaptively update the target taps of the recording channel. The adaptive path modules may use a linearly constrained least-mean square (LC-LMS) algorithm to determine the amount and direction of each tap update, where the linear constraint may be a maximum phase or a mixed phase constraint. The adaptive path modules may operate independently of and be decoupled from the data path modules.

29 Claims, 11 Drawing Sheets

US 7,948,703 B1

ADAPTIVE TARGET OPTIMIZATION METHODS AND SYSTEMS FOR NOISE WHITENING BASED VITERBI DETECTORS

CROSS-REFERENCE TO RELATED APPLICATIONS

This claims the benefit under 35 U.S.C. §119(e) of U.S. Provisional Application No. 61/024,700, filed Jan. 30, 2008, which is hereby incorporated herein by reference in its entirety.

BACKGROUND OF THE DISCLOSURE

The disclosed technology relates generally to recording channels, and more particularly to providing adaptive target optimization for recording channels.

With the continuing demand for high-density digital storage systems, various techniques have been applied to increase the capacity of these systems. For example, in magnetic media storage, many manufacturers are using perpendicular recording rather than traditional longitudinal recording to pack more information into a smaller area. However, as storage densities are pushed to their limits and beyond, the amount of signal distortion on information-carrying signals have increased dramatically. Thus, detectors are heavily relied upon to interpret the information in these highly distorted signals. For example, Viterbi detectors with noise-whitening filters have been developed to combat signal-dependent noise associated with reading data from a recording channel.

The performance of a detector is affected by the value of the target of the recording channel. The target of a recording channel refers to a set of registers that can be programmed to achieve different channel responses. Based on the current operating conditions and device manufacturing variations, the target that produces the best detection performance may vary from device to device and/or from time to time. Current systems select a target by evaluating the performance of the detector for all possible values of the target. Such an exhaustive search can be time consuming and impractical to perform in real-time. For example, for a target with three programmable registers—or three "taps"—where each tap can be programmed with a value from zero to 15, the system would need to evaluate over 3300 different target tap combinations in order to choose a target.

SUMMARY OF THE DISCLOSURE

Accordingly, systems and methods are provided for adaptively computing a target that provides high detection performance without requiring an exhaustive search.

A read channel apparatus for a recording channel configured in accordance with the present invention may include an adaptive target computation module. The target computation module can compute and adaptively update the target of the recording channel. In particular, the adaptive target computation module may update the taps of the target to achieve a high detection performance. The adaptive target computation module may use a linearly constrained least-mean square (LC-LMS) algorithm to determine the amount and direction of each tap update. The linear constraint causes the adaptive target computation module to fix one of the taps of the target other than the first tap to a predetermined value (e.g., one). For example, the adaptive target computation module may fix the last tap to one (sometimes referred to as "maximum phase target adaptation") or may fix one of the middle taps to one (sometimes referred to as "mixed phase target adaptation").

The adaptive target computation module may operate in conjunction with an adaptive equalizer. The adaptive equalizer operates on a digitized version of a readback signal obtained from the recording channel. Thus, the output of the equalizer may be referred as the actual response of the recording channel. The target computation module and adaptive equalizer may be jointly updated in real-time based on the LC-LMS algorithm. The LC-LMS algorithm attempts to reduce the difference between the actual response of the recording channel and the desired response defined by the target. Accordingly, the read channel apparatus may compute an error value between the current actual response (produced by the adaptive equalizer) and the current desired response (produced by the target computation module). The adaptive equalizer and target computation module may then use the error value to update the current values of the equalizer taps and target taps, respectively.

The read channel apparatus may include read channel apparatus components configured to interpret readback signals and produce estimates of the user information contained with the readback signals. The read channel apparatus components may include, for example, an equalizer and a noise-whitening based Viterbi detector (sometimes referred to as a "nonlinear Viterbi detector" or "NLV detector"). In some embodiments, the adaptive target computation module may generate target updates using the estimates of user information produced by the NLV detector, since the actual value of the user information is not known to the read channel apparatus.

The target computation module and adaptive equalizer may be decoupled from and operate independently of other read channel apparatus components. Thus, the read channel apparatus components that operate to generate user information estimates may be referred to as "data path" modules, and the adaptive components (e.g., the target computation module and adaptive equalizer) may be referred to as "adaptive path" modules. Since the adaptive path modules are decoupled from the data path modules, the adaptive path modules may advantageously be implemented in hardware, firmware, or software regardless of the implementation of the data path modules. Also, the adaptive path modules may advantageously be implemented in existing recording channel systems and with existing read channel apparatus designs.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
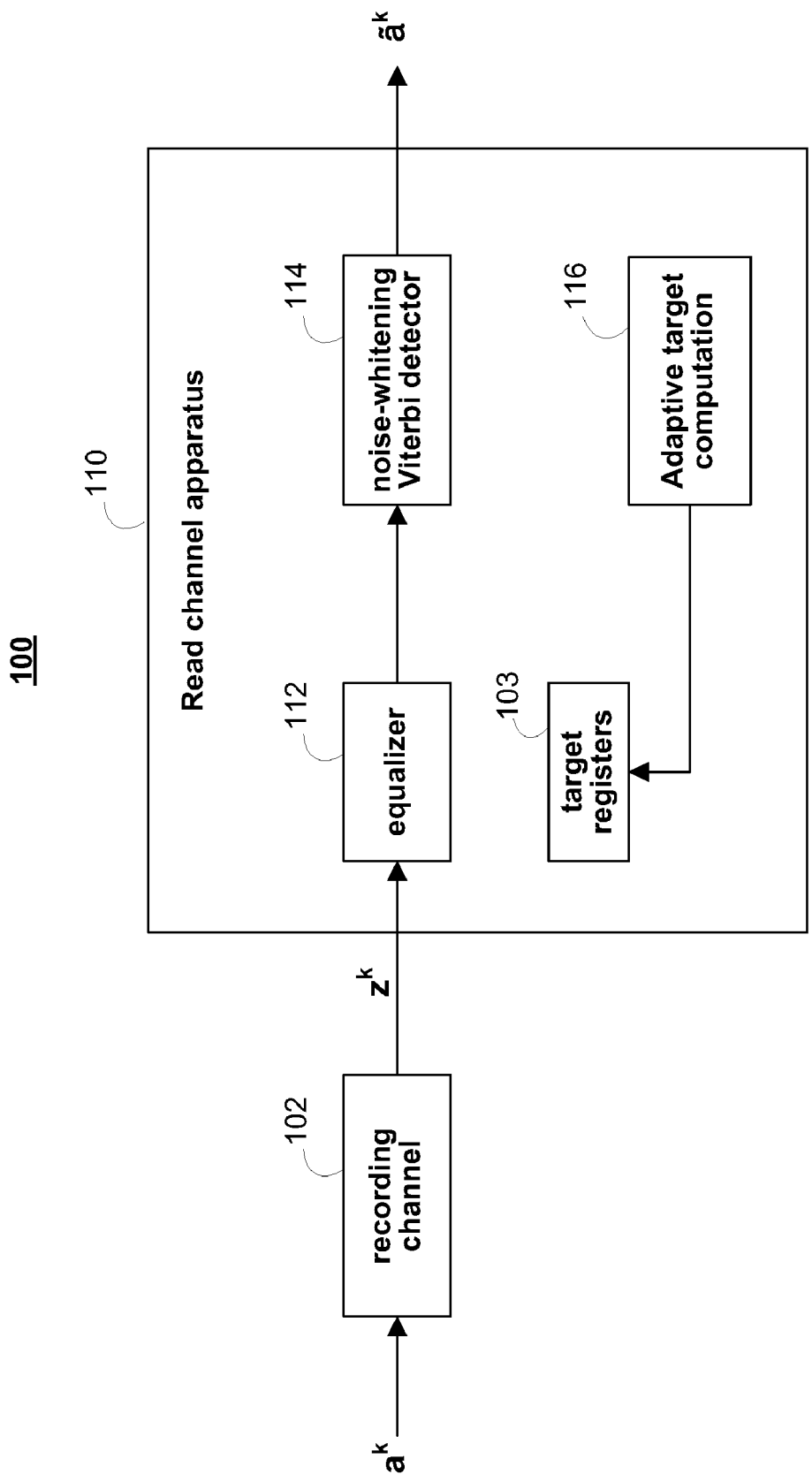
FIG. 1 is a simplified block diagram of an illustrative data communications or storage system.

FIG. 1 is a simplified block diagram of illustrative storage system 100. Storage system 100 can include recording channel 102 and read channel apparatus 110. Storage system 100 is an apparatus that allows user information, $a^k$, to be stored in recording channel 102, and later retrieved and interpreted by read channel apparatus 110. The user information may be any suitable data in digital form, and may be stored in recording channel 102 as an information-bearing signal. To interpret the information-bearing signal, read channel apparatus 110 can include equalizer 112, and noise-whitening-based Viterbi detector 114.

Recording channel 102 may be any suitable storage medium that can change or distort the information-bearing signal. For example, recording channel 102 may be a magnetic storage medium (e.g., a hard disk), an electrical storage medium (e.g., RAM), or an optical storage medium (e.g., a compact disc). The amount of signal distortion in the information-bearing signal depends on the type of the storage medium and the density of storage. For magnetic storage mediums, recording channel 102 may have any of the typical characteristics of a magnetic recording channel (e.g., signal dependent noise, such as transition jitter).

Read channel apparatus 102 includes target registers 103 that allow the target of recording channel 102 to be programmed or reprogrammed. Target registers 103 may include a plurality of registers, where each register is used to store one tap. For example, in some embodiments, target registers 103 may include three four-bit registers. In these embodiments, Read channel apparatus 102 supports a three-tap target, where each tap can be programmed to one of sixteen values (between 0-15, inclusive). The number of tap targets may be referred to by the variable, t, which can be any suitable integer. The values saved in target registers 103 sets the channel response of the concatenation of recording channel 102 and equalizer 112 close to a chosen target, and in turn may affect the ability of noise-whitening-based Viterbi detector 114, described below, to recover the stored user information.

When the information-bearing signal is retrieved from recording channel 102, the signal may be different than the intended signal stored in recording channel 102. The information-bearing signal obtained from recording channel 102 may be referred to as a "readback signal." Read channel apparatus 110 may obtain the readback signal, where it is then processed by equalizer 112. In particular, equalizer 112 may operate on a digitized version of the readback signal, $z^k$. Equalizer 112 may be any suitable type of equalizer or filter that shapes the frequency profile of the digitized readback signal. Equalizer 112 may have any suitable filtering characteristics, and may operate using any number of equalizer taps. The number of equalizer taps may be referred to by the variable, e. In some embodiments, equalizer 112 may be a finite input response (FIR) filter.

Noise-whitening-based Viterbi detector 114 may produce an estimate, $\hat{a}^k$, of the stored user information using the equalized readback signal. Viterbi detector 114 may, for example, include a noise-whitening filter that further equalizes/filters the output of equalizer 112. The noise-whitening filter may include filters that are designed to whiten signal-dependent noise, such as transition jitter, that occurs as a result of storage in recording channel 102. The noise-whitening filtering may involve nonlinear computations, and therefore Viterbi detector 114 may sometimes be referred to as a nonlinear Viterbi (NLV) detector. NLV detector 114 may include any other suitable components for producing the estimate of the user information. For example, the nonlinear Viterbi detector 114 may include a module for computing branch metrics, as well as a Viterbi add-compare select (ACS) module and trace back module.

Although FIG. 1 is described as being a storage system, this is merely illustrative. In other embodiments, system 100 may be part of a wired or wireless communications system for conveying user information $a^k$ from a source to a destination. In these embodiments, channel 102 may represent the communications medium through which the user information is conveyed as an information-bearing signal.

The values programmed into target registers 103 may be adjusted to allow equalizer 112 and NLV detector 114 to operate with maximal or nearly maximal performance. In some embodiments, read channel apparatus 110 may include adaptive target computation module 116 to compute the target tap adjustments for tap registers 103. Adaptive target computation module 116 may update the taps stored in registers 203 such that the difference between the response that can actually be obtained by equalizer 112 and the desired response associated with a given target is minimized. This way, the equalization and detection performed by equalizer 112 and Viterbi detector 114, respectively, is most able to recover the original user information.

In some embodiments, to achieve or maintain a high detection performance, the equalizer and target taps may be adaptively obtained based on an algorithm referred to as the linearly constrained least-mean-square (LC-LMS) algorithm. The LC-LMS algorithm may define the way in which the e equalizer taps of an adaptive equalizer should be adjusted. The e equalizer taps are collectively referred to by the vector, $f^k$, given by:

$$f^k = [f_0^k\ f_1^k \ldots f_{e-1}^k]^T. \quad (EQ.1)$$

Adaptive target computation module 116 also uses the LC-LMS algorithm to update the t target taps of recording channel 102. The t+1 target taps are collectively referred to by the vector, $g^k$, given by:

$$g^k = [g_0^k\ g_1^k \ldots g_{t-1}^k]^T \quad (EQ.\ 2)$$

In EQ. 1 and EQ. 2, e, t, each $g_i^k$, and $f_i^k$ can be any suitable value. The LC-LMS algorithm will be described in detail in connection with FIG. 2.

Figure 2:
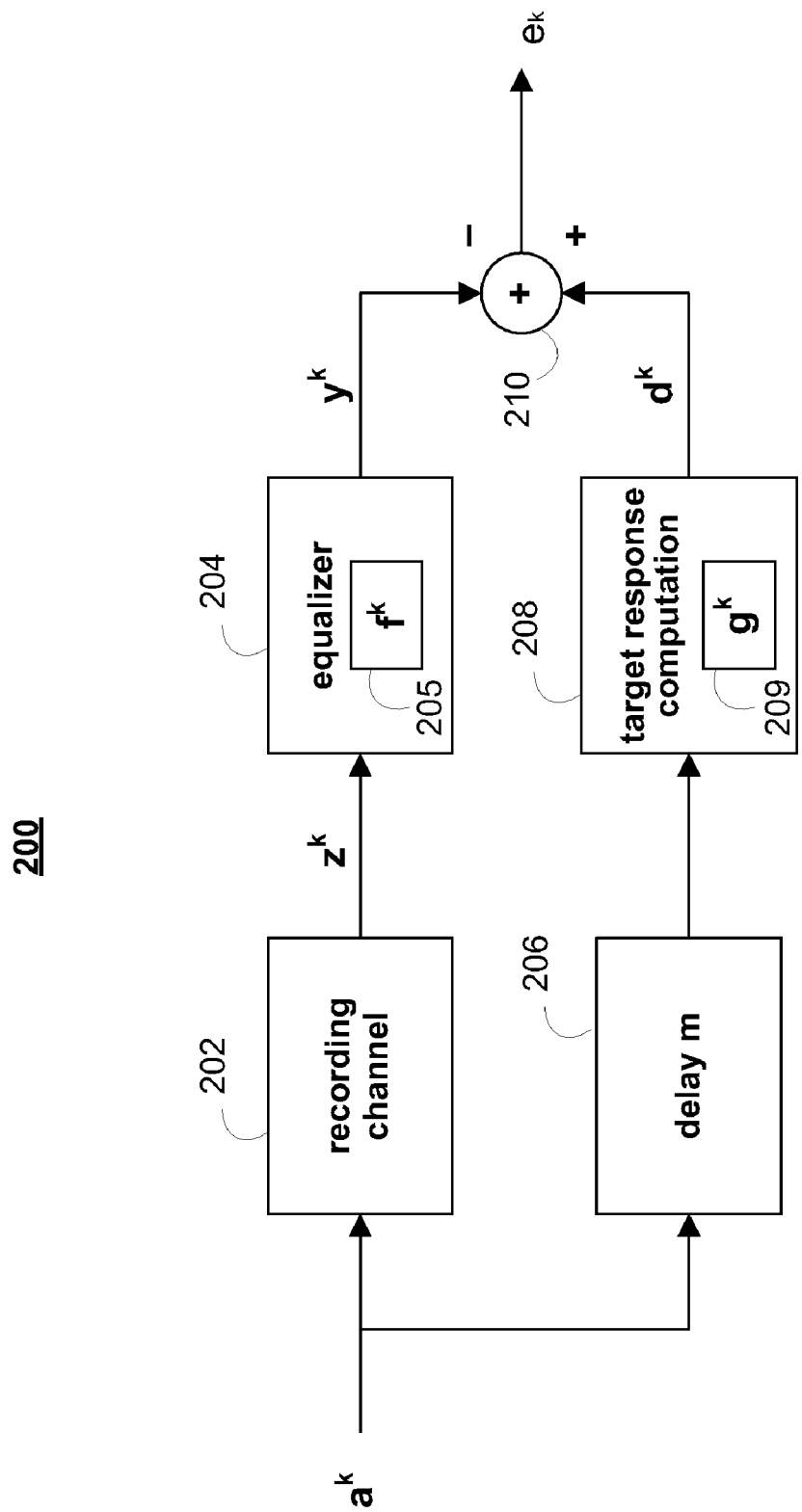
FIG. 2 is a simplified block diagram of an illustrative storage system model for deriving real-time target adjustments using the disclosed linearly constrained least-mean-square (LC-LMS) algorithm.

FIG. 2 is a simplified block diagram of storage system model 200, which may be used to derive the equalizer and target tap adjustments for a recording channel using the LC-LMS algorithm. Storage system model 200 includes recording channel 202, e-tap equalizer 204, delay block 206, t-tap target response computation module 208, and difference module 210. In FIG. 2, equalizer 204 may have taps 254 which are defined according to EQ. 1, described above. Target response computation module 208 may have target taps 209 which are defined according to EQ. 2, described above. Also, recording channel 202 may have any of the features and characteristics of recording channel 102 (FIG. 1), described above, and may represent any suitable storage medium (e.g., a magnetic storage medium).

e-tap equalizer 204 may have any of the features and functionalities of equalizer 112. e-tap equalizer 204 may be configured to equalize a readback signal obtained from recording channel 202. Since equalizer 204 has e equalizer taps 205, equalizer 204 may operate on e digitized samples of the readback signal—a current sample and e−1 previous samples of the readback signal. Thus, the digitized samples of the readback signal may be represented as the e-dimensional vector, $$z^k = [z_k\, z_{k-1} \ldots z_{k-e+1}]^T. \quad (\text{EQ. 3})$$

Equalizer 204 may equalize the digitized samples of the readback signal (represented as the components of EQ. 3) using the e equalizer taps 205. Mathematically, this results in a convolution of equalizer taps 205 (as expressed in EQ. 1) with the digitized samples of the readback signal (as expressed in EQ. 3). The result of the convolution is given by the vector:

$$y^k = (z^k)' f^k. \quad (\text{EQ. 4})$$

The vector, $y^k$, produced by equalizer 204 may sometimes be referred to as the "actual response" of recording channel 202. That is, since a detector or decoder (e.g., an NLV detector, not shown) implemented in system 200 would operate on the output of equalizer 204 instead of directly on the output of recording channel 202, the filtering effect of equalizer 204 may be treated as if part the channel response.

In some embodiments, storage system model 200 can include target response computation module 208, which may be a component implemented in an adaptive target computation module (e.g., adaptive target computation module 116 of FIG. 1). Target response computation module 208 is configured to generate the expected response of recording channel 202 for a given target 209 and user information input. Since target 209 has t taps, recording channel 202 has a memory of t in which a current output is affected by the signal for t bits/symbols of user information—the current bit/symbol and t−1 previous bits/symbols. Thus, the user information may be represented as the t-dimensional vector, $$a^k = [a_k\, a_{k-1} \ldots a_{k-t+1}]^T. \quad (\text{EQ. 5})$$

Target Response Computation Module 208 May Process the user information to obtain a target channel response, also referred to as a "desired channel response" of recording channel 202. To produce the desired channel response for the current value of the target, target response computation module 208 filters an unaltered, delayed version of the user information using the taps of target 209. The delayed version is obtained from delay block 206, which models a delay of m sample periods associated with the storage and retrieval of the user information from recording channel 202. Mathematically, target response computation module 208 convolves the delayed user information with the current value of the target 209, e.g., $$d^k = (a^{k-m})' g^k. \quad (\text{EQ. 6})$$

Thus, the desired response of recording channel 202 may be changed by adjusting the value of the target.

Recording channel model 200 also includes difference model 210, which computes the difference between the actual response and the desired response of recording channel 202. This difference may be referred to as an error value, and is given by:

$$e_k = (a^{k-m})' g^k - (z^k)' f^k. \quad (\text{EQ. 7})$$

The LC-LMS algorithm may be used to adjust the taps of target 209 and equalizer taps 205 in a manner that minimizes the error value. This way, the detector (e.g., detector 114 of FIG. 1) may process $y^k$ assuming that the desired and actual response are substantially the same. That is, using the value of the actual response and the known current value of target 208, the detector may recover the user information with high probability.

Target 209 and equalizer taps 205 may be recomputed or adjusted using the LC-LMS algorithm to minimize the squared error value under a linear constraint. In particular, at each time interval (e.g., for each sample of the readback signal), equalizer taps 205 and target 209 may be jointly recomputed and reconfigured such that the error value satisfies the expression, $$\min(E\{(e_k)^2\}) \quad (\text{EXPR. 1})$$

under a linear constraint. With the linear constraint, target 209 and equalizer taps 205 are recomputed with the additional condition that target 209 satisfies:

$$C \cdot g = c. \quad (\text{EQ. 8})$$

Here, C is an $N_c \times t$ constraint matrix and c is an $N_c$-dimensional linear vector, where C and c can have entries of any suitable value. Also, $N_c$ may be a suitable integer of any suitable size. EQ. 8 may sometimes be referred to as a "linear constraint equation."

In accordance with the LC-LMS algorithm, equalizer taps 205 are updated at each time interval according to, $$f^{k+1} = f^k + \mu_f e_k z^k, \quad (\text{EQ. 9})$$

where $f^k$ is a vector of the current values of equalizer taps 205, $f^{k+1}$ is a vector of values that will be used as equalizer taps 205 in the next time interval, and $\mu_f$ is a predetermined equalizer adaptation constant of a suitable value. During the same time interval, the taps of target 209 may be updated based on the LC-LMS algorithm according to, $$g^{k+1} = \tilde{g}^{k+1} + \theta^{k+1} \text{ and} \quad (\text{EQ. 10})$$

$$\tilde{g}^{k+1} = g^k + \mu_t e_k a^{k-m}. \quad (\text{EQ. 11})$$

Here, $g^k$ is a vector of the current values of the target taps, $g^{k+1}$ is a vector of the target taps that will be configured as target 209 for use in the next time interval, and $\mu_t$ is a predetermined target adaptation constant of a suitable value.

Thus, the equalizer taps 205 and the taps of target 209 may be changed during operation of equalizer 204 and target response computation module 208. In other words, the adaptive updates of equalizer taps 205 and the taps of target 209 may occur in "real-time." Real-time updates refer to changes that are made while samples of the readback signal are obtained and detected (as opposed to updates that occur during initialization of a system), and may be based on the current detection performance or generally on the current state of the system.

To satisfy the linear constraint equation, the t×1 auxiliary vector, $\theta^{k+1}$, in EQ. 10 is selected such that the linear constraint equation and the following expression are satisfied:

$$\min((\theta^{k+1})' \theta^{k+1}). \quad (\text{EXPR. 2})$$

Given these constraints, and using Lagrange multipliers, the optimal $\theta^{k+1}$ can be computed as:

$$\theta_{k+1} = C'(CC')^{-1}[c - C\tilde{g}^{k+1}], \quad (\text{EQ. 12})$$

where C is the constraint matrix and c is a linear vector, as described above in connection with EQ. 8. Therefore, based on EQ. 10 through EQ. 12, equalizer taps 205 and the taps of target 209 may be adaptively recomputed according to, $$f^{k+1} = f^k + \mu_f e_k z^k \text{ and} \quad (EQ. 13)$$

$$g^{k+1} = A(g^k - \mu_t e_k d^{k-m}) + C^\# c, \quad (EQ. 14)$$

respectively, where:

$$C^\# = C'(CC')^{-1} \text{ and} \quad (EQ. 15)$$

$$A = I - C^\# C. \quad (EQ. 16)$$

In some embodiments of the present invention, the constraint matrix and linear vector may be selected such that a maximum phase target adaptation is achieved. Maximum phase adaptation may be effective and particularly suitable for use with an NLV detector (e.g., NLV detector 106 of FIG. 1). For maximum phase adaptation, the elements in the linear constraint equation are chosen such that the last tap of target 209 is initially fixed to a predetermined value, such as one. To fix the last tap to one, the constraint matrix and linear vector are selected to obtain the linear constraint equation:

$$Cg = \begin{pmatrix} 0 & & \\ & \ddots & \\ & & 1 \end{pmatrix} \begin{pmatrix} g_0 \\ \vdots \\ g_t \end{pmatrix} = c = \begin{pmatrix} 0 \\ \vdots \\ 1 \end{pmatrix}, \quad (EQ. 17)$$

where the constraint matrix is an all-zero matrix except for the bottom left entry, and the linear vector is an all-zero vector except for the last entry. With this constraint equation, the taps of target 209 are adaptively adjusted at each time interval according to, $$g^{k+1} = \begin{pmatrix} g_0^k + \mu_t e_k a_0^{k-m} \\ g_1^k + \mu_t e_k a_1^{k-m} \\ \vdots \\ 1 \end{pmatrix}, \quad (EQ. 18)$$

for maximum phase adaptation. Note that the last tap is set to one, while the remaining taps are adjusted from their previous value by some correction factor. The correction factor is determined based on a target adaptation constant, the current error value, and one bit or symbol of the stored user information.

In other embodiments of the present invention, the constraint matrix and linear vector may be selected such that a mixed phase target adaptation is achieved. In some scenarios, mixed phase adaptation may be effective and particularly suitable for use with an NLV detector (e.g., NLV detector 106 of FIG. 1). For mixed phase adaptation, the elements in the linear constraint equation are chosen such that one tap of target 209 other than the first or the last tap is initially fixed to a predetermined value, such as one. To fix the second to last tap to one, the constraint matrix and linear vector are selected to obtain the linear constraint equation:

$$Cg = \begin{pmatrix} 0 & & & \\ & \ddots & & \\ & & 1 & \\ & & & 0 \end{pmatrix} \begin{pmatrix} g_0 \\ \vdots \\ g_t \end{pmatrix} = c = \begin{pmatrix} 0 \\ \vdots \\ 1 \\ 0 \end{pmatrix}, \quad (EQ. 19)$$

where the constraint matrix is an all-zero matrix except for the second to last entry along the diagonal, and the linear vector is an all-zero vector except for the second to last entry. With this constraint equation, the taps of target 209 may be adaptively adjusted at each time interval according to, $$g^{k+1} = \begin{pmatrix} g_0^k + \mu_t e_k a_0^{k-m} \\ g_1^k + \mu_t e_k a_1^{k-m} \\ \vdots \\ 1 \\ g_t^k + \mu_t e_k a_t^{k-m} \end{pmatrix} \quad (EQ. 20)$$

for a mixed phase adaptation scheme. Note that the second to last tap is set to one, while the remaining taps are adjusted from their previous value by some correction factor. The correction factor is determined based on the target adaptation constant, the current error value, and one bit or symbol of the stored user information.

Any of the taps instead of the second to last tap may be fixed to one in a mixed phase adaptation scheme. For example, the second, third, fourth, etc. tap in the target may be fixed to one. In these embodiments, the constraint matrix and linear vector of EQ. 19 may be changed such that a different entry in the matrix and vector is the only non-zero entry.

In still other embodiments of the present invention, the constraint matrix and linear vector may be selected such that a minimum phase target is achieved. For minimum phase adaptation, the elements in the linear constraint equation are chosen such that the first tap is initially fixed to a predetermined value, such as one. The appropriate constraint matrix, linear vector, and tap adjustment equations may be derived in a similar fashion as described above for maximum and mixed phase target adjustments.

Figure 3A:
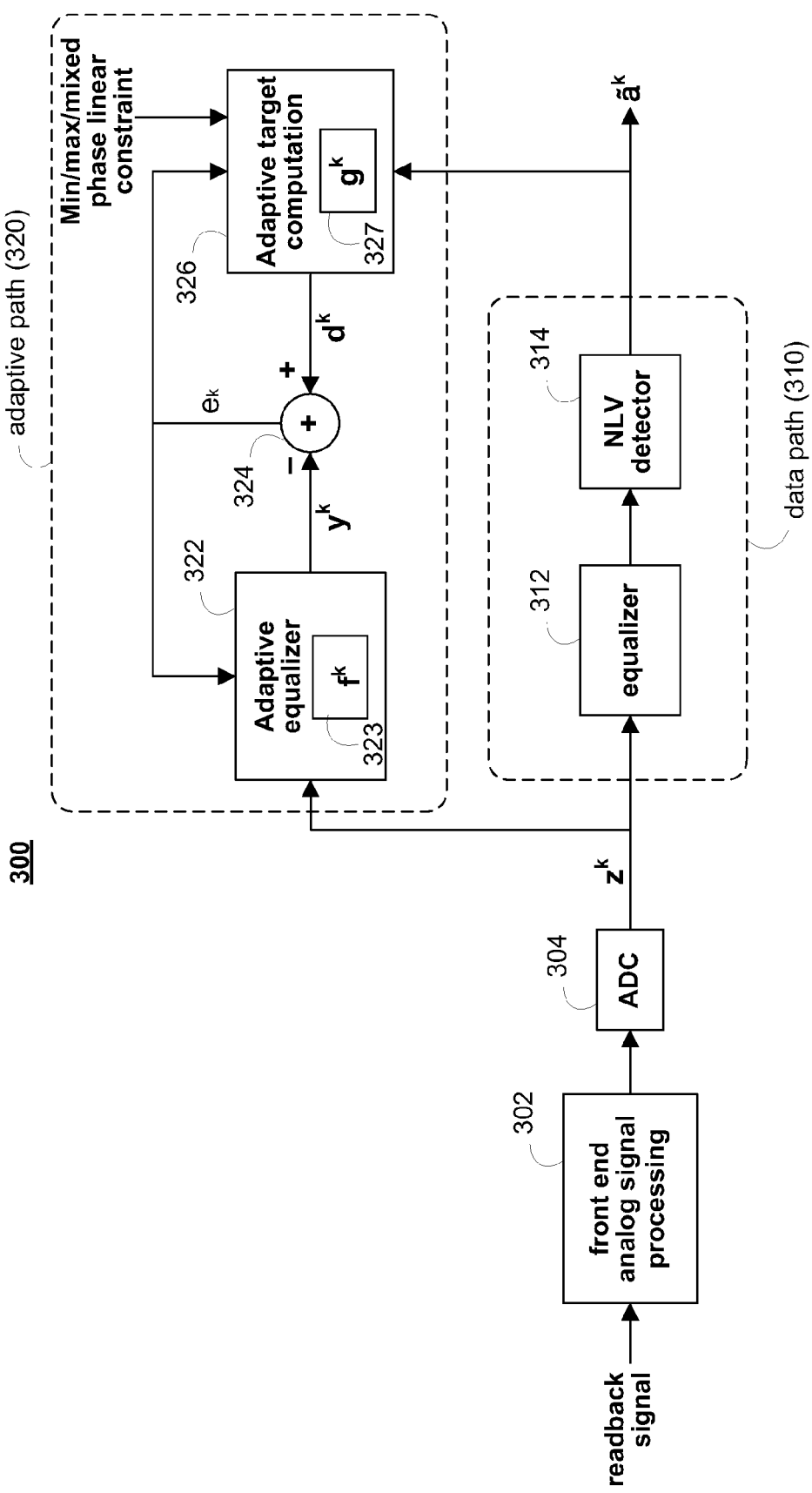
FIG. 3A is a simplified block diagram of an illustrative read channel apparatus with an adaptive path for adaptively adjusting the target using the disclosed LC-LMS algorithm.

FIG. 3A is a simplified block diagram of read channel apparatus 300, which may be a more detailed view of read channel apparatus 110 of FIG. 1. Read channel apparatus 300 can include front end analog signal processing module 302, analog-to-digital converter (ADC) 304, equalizer 312, NLV detector 314, adaptive equalizer 322, difference module 324, and adaptive target computation module 326. Front end analog signal processing module 302 may obtain a readback signal from a recording channel (e.g., recording channel 102 of FIG. 1) for initial preprocessing. ADC 304 may then perform an analog-to-digital conversion on the preprocessed readback signal to digitize samples of the signal, e.g., $z^k$.

Equalizer 312 and NLV detector 314 may be the same or similar to equalizer 104 (FIG. 1) and NLV detector 106 (FIG. 1), and may be configured to produce an estimate of the stored user information from the digitized readback signal produced by ADC 304. Thus, equalizer 312 and NLV detector 314 may be within the data path 310 of read channel apparatus 300, and may each be referred to as a data path module.

Read channel apparatus 300 may include the components of adaptive path 320, which are used to update the taps of the target. These components may include adaptive equalizer 322, difference module 324, and adaptive target computation module 326, which each may be referred to sometimes as an adaptive path module. Adaptive equalizer 322 and difference module 324 may have any of the features and functionalities described above in connection with equalizer 204 (FIG. 2) and difference module 210 (FIG. 2), respectively. Adaptive target computation module 326 may be the same or similar to adaptive target computation module 116, and may include a component that is the same or similar to target response computation module 208 (FIG. 2). In particular, adaptive equalizer 322 computes the actual response of the recording channel from the digitized readback signal $z^k$ using equalizer taps 323, adaptive target computation module 326 computes the desired response of the recording channel for the current value of target 327, and difference module 324 computes an error value $e_k$ between the actual and the desired response.

In addition to computing the actual and desired channel responses, adaptive equalizer 322 and adaptive target computation module 326 may perform real-time adjustments of equalizer taps 323 and target 327, respectively. More particularly, adaptive equalizer 322 may be configured to adjust the value of taps 323 according to EQ. 13 described above, which is reproduced below for convenience as:

$$f^{k+1} = f^k + \mu_f e_k z^k. \quad \text{(EQ. 21)}$$

To Compute the Equalizer Tap Adjustment at Each Time interval, adaptive equalizer 322 is coupled to the output of ADC 304 to obtain the current sample of $z^k$ and to the output of difference module 324 to obtain the current error value.

In some embodiments, adaptive target computation module 326 uses a minimum phase, maximum phase, or a mixed phase adaptation scheme to adjust target 327 at each time interval. Adaptive target computation module 326 may include a linear constraint input that module 326 uses to determine which type of real-time adjustments to apply. The linear constraint input may be provided by the control circuitry (not shown) of apparatus 350 that generally controls the operation of apparatus 350. For maximum phase adaptation, adaptive target computation module 326 may be configured to compute EQ. 18 at each time interval, reproduced below as EQ. 22 for convenience as:

$$g^{k+1} = \begin{pmatrix} g_0^k + \mu_t e_k a_0^{k-m} \\ g_1^k + \mu_t e_k a_1^{k-m} \\ \vdots \\ 1 \end{pmatrix}. \quad \text{(EQ. 22)}$$

In other scenarios, based on the linear constraint input, adaptive target computation module 326 may be configured to compute EQ. 20 at each time interval, reproduced below as EQ. 23 for convenience:

$$g^{k+1} = \begin{pmatrix} g_0^k + \mu_t e_k a_0^{k-m} \\ g_1^k + \mu_t e_k a_1^{k-m} \\ \vdots \\ 1 \\ g_t^k + \mu_t e_k a_t^{k-m} \end{pmatrix} \quad \text{(EQ. 23)}$$

to perform mixed phase adaptation.

To compute the target tap adjustments in real-time, adaptive target computation module 326 is coupled to the output of difference module 324 to obtain the current error value. Adaptive target computation module 326 cannot directly obtain the bits or symbols of user information, $a^k$, as this is the information that read channel apparatus 300 is attempting to recover. Instead, adaptive target computation module 326 uses the recovered version of the user information computed by NLV detector 314. Thus, adaptive target computation module 326 may be coupled to the output of NLV detector 314, and can be configured to actually compute:

$$g^{k+1} = \begin{pmatrix} g_0^k + \mu_t e_k n_0^{k-m} \\ g_1^k + \mu_t e_k n_1^{k-m} \\ \vdots \\ 1 \end{pmatrix} \quad \text{(EQ. 24)}$$

for maximum phase adaptation, or:

$$g^{k+1} = \begin{pmatrix} g_0^k + \mu_t e_k n_0^{k-m} \\ g_1^k + \mu_t e_k n_1^{k-m} \\ \vdots \\ 1 \\ g_t^k + \mu_t e_k n_t^{k-m} \end{pmatrix} \quad \text{(EQ. 25)}$$

in one embodiment of mixed phase adaptation. EQ. 24 and EQ. 25 are the same as EQ. 22 and EQ. 23 above, except that the actual values of the user information are replaced by estimates of the user information. The estimates generated by NLV detector 314 can include detection errors that result in the estimates being different from their actual values—this causes EQ. 24 and EQ. 25 to be at least slightly different from EQ. 22 and EQ. 23. However, in practice, these errors may have little effect on the overall performance and convergence achieved by adaptive target computation module 326.

With continued reference to FIG. 3A, the adaptive path modules may be decoupled from the data path modules. More particularly, the adaptive path modules may operate independently from the data path modules (and vice versa) and without interfering with the operation of the data path modules (and vice versa). For example, adaptive equalizer 322 and equalizer 312 may operate independent of each other. In other words, adaptive equalizer 322 and equalizer 312 may not interfere with each other while performing their operations. As another example, although the adaptive path modules may operate independently from the data path modules, the adapted values from equalizer taps 323 and/or the value of target 327 may be loaded into the data path 310 (i.e. equalizer 312 and NLV detector 314) at different times. It may also be possible to perform target and equalizer adaptation associated with adaptive path 320 directly on the data path 310 (i.e. equalizer 312 and NLV detector 314) using modules and algorithms that are substantially the same as those of adaptive path 320.

If the adaptive path modules operate independently from the data path modules (and vice versa), the adaptive path modules may be added to any existing read channel apparatus that only includes data path modules. The added adaptive path modules may be used to adaptively and optimally adjust the target of the recording channel, which would advantageously improve the detection performance and reliability of the existing apparatus.

Because of the decoupled nature of the adaptive and data path modules, the adaptive path modules may be implemented using any suitable approach regardless of the implementation of the data path modules. In particular, the adaptive path modules may be implemented in hardware, software, or firmware regardless of whether the data path modules are implemented in hardware, software, or firmware. Moreover, the adaptive path modules may or may not be implemented on the same hardware component (e.g., integrated circuit) or software/firmware component (e.g., using the same instruction memory) as the data path modules.

Figure 3B:
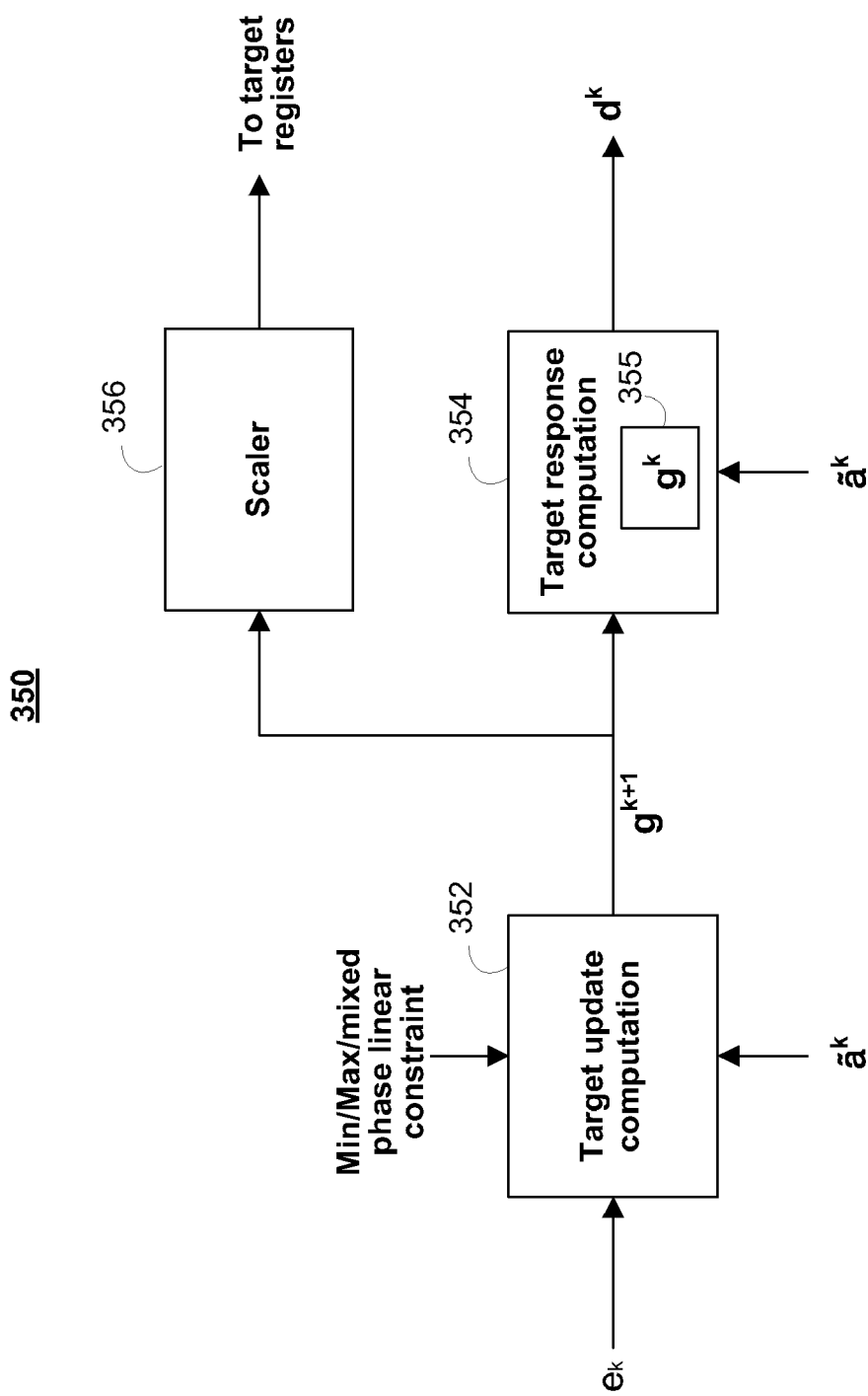
FIG. 3B is a simplified block of an illustrative adaptive target computation module for adaptively adjusting the target of a recording channel.

Turning now to FIG. 3B, a simplified block diagram of adaptive target computation apparatus 350 is shown, which may be a more detailed view of adaptive target computation module 116 of FIG. 1 and/or adaptive target computation module 324 of FIG. 3A. Adaptive target computation apparatus 350 may include target update computation module 352, target response computation module 354, and scaler module 356. Each of these modules may be hardware, software, or firmware modules.

Target update computation module 352 may be the module of apparatus 350 that computes the tap updates at each time interval. In particular, using the current error value and a detected version of the user information, target update computation module 352 may compute the target tap values that will be used in the next time interval. As described above, based on the linear constraint input, target update computation module 352 may use a maximum phase or mixed phase adaptation scheme, which may be particularly effective adaptation schemes when used with an NLV detector. Alternatively, target computation module 352 may apply a minimum phase adaptation scheme.

Target response computation module 354 may have any of the features or functionalities of target response computation module 208 of FIG. 2, described above. Target response computation module 354 may compute the desired channel response using the current value of target taps 355 and the detected version of the user information. Target response computation module 354 may then replace the current value of target taps 355 with the next value, $g^{k+1}$, computed by target update computation module 352. Thus, at the next time interval, target update computation module 352 may perform the same adaptive computation, but using different tap values and the next bit or symbol of detected user information.

Some recording channels may have an integer constraint or a range constraint on the target taps. Thus, to produce target taps that satisfy the constraints, the target taps computed by target update computation module 352 at each time interval may first be provided to scaler module 356 before being programmed into a recording channel. Scaler module 356 may scale the target taps by some suitable amount to produce scaled taps that are each approximately integer-valued. The scaled taps may be rounded or truncated to produce integer-valued taps, and then stored in the target registers (e.g., target registers 103 of FIG. 1) of a recording channel. For example, for a recording channel with a normalized recording density of 1.1, noise that is 90% jitter noise and 10% additive white Gaussian noise (AWGN), a signal-to-noise ratio (SNR) of 20 dB, and an 11 tap equalizer, target update computation module 352 may produce a target with taps [0.0881, 0.5348, 1.000]. In this scenario, scaler module 356 may scale this target by 12 to produce a scaled and truncated target of [−1, 6, 12]. The scaled and truncated target may then be used as the target that is stored in the target registers of the recording channel. In embodiments where integer-valued taps or other constraints are not required, apparatus 350 may not include scaler module 356. In these embodiments, the output of target update computation module 352 may be stored in the target registers of a recording channel.

Referring now to FIGS. 4-10, various exemplary implementations of the present invention are shown.

Figure 4:
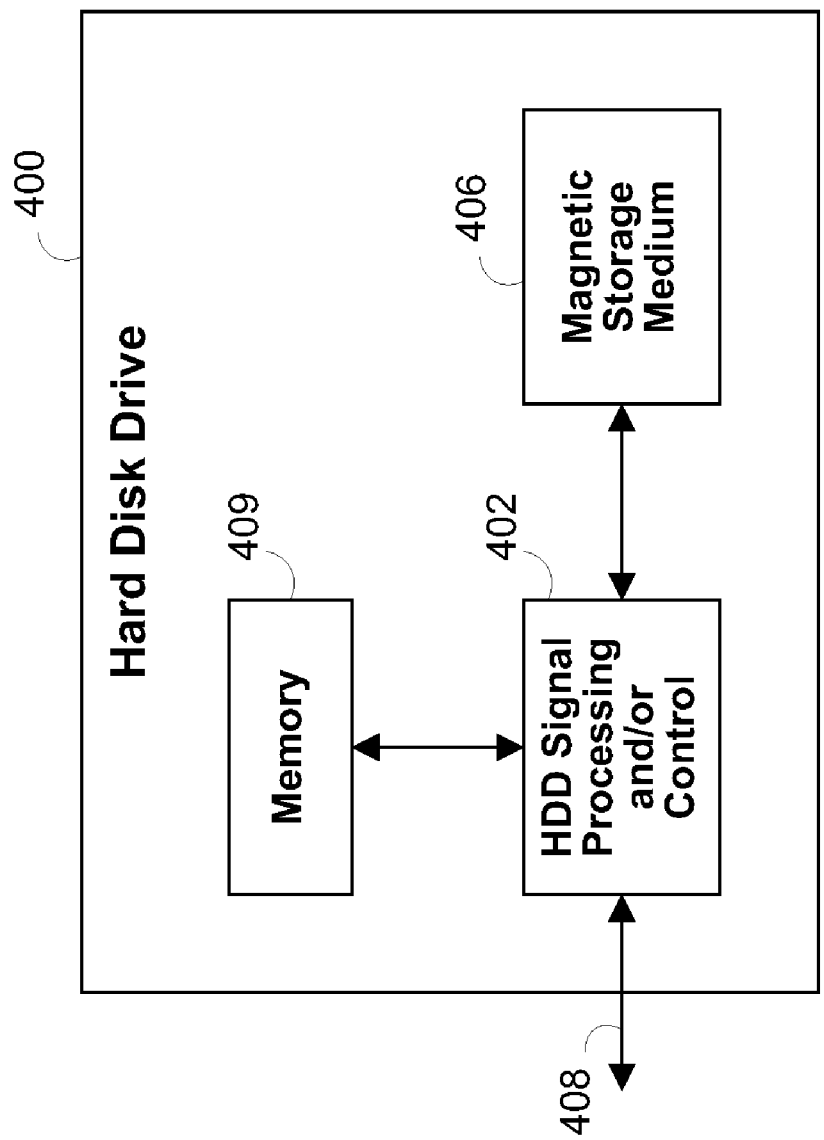
FIG. 4 is a block diagram of an exemplary hard disk drive that can employ the disclosed technology.

Referring now to FIG. 4, the present invention can be implemented in a hard disk drive (HDD) 400. The present invention may implement either or both signal processing and/or control circuits, which are generally identified in FIG. 4 at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), nonvolatile memory such as flash memory, read only memory (ROM) and/or other suitable electronic data storage.

Figure 5:
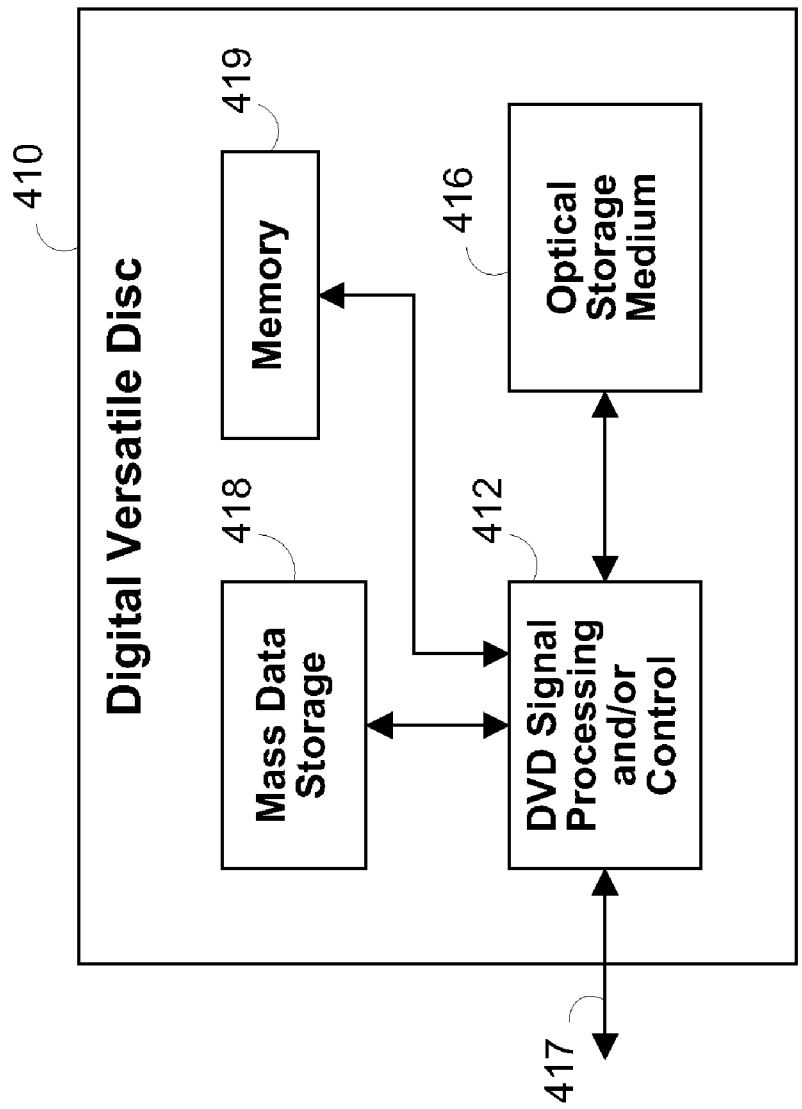
FIG. 5 is a block diagram of an exemplary digital versatile disc that can employ the disclosed technology.

Referring now to FIG. 5, the present invention can be implemented in a digital versatile disc (DVD) drive 410. The present invention may implement either or both signal processing and/or control circuits, which are generally identified in FIG. 5 at 412, and/or mass data storage 418 of the DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 4. The HDD may be a mini HDD that includes one or more platters having a diameter that is smaller than approximately 1.8". The DVD drive 410 may be connected to memory 419 such as RAM, ROM, nonvolatile memory such as flash memory and/or other suitable electronic data storage.

Figure 6:
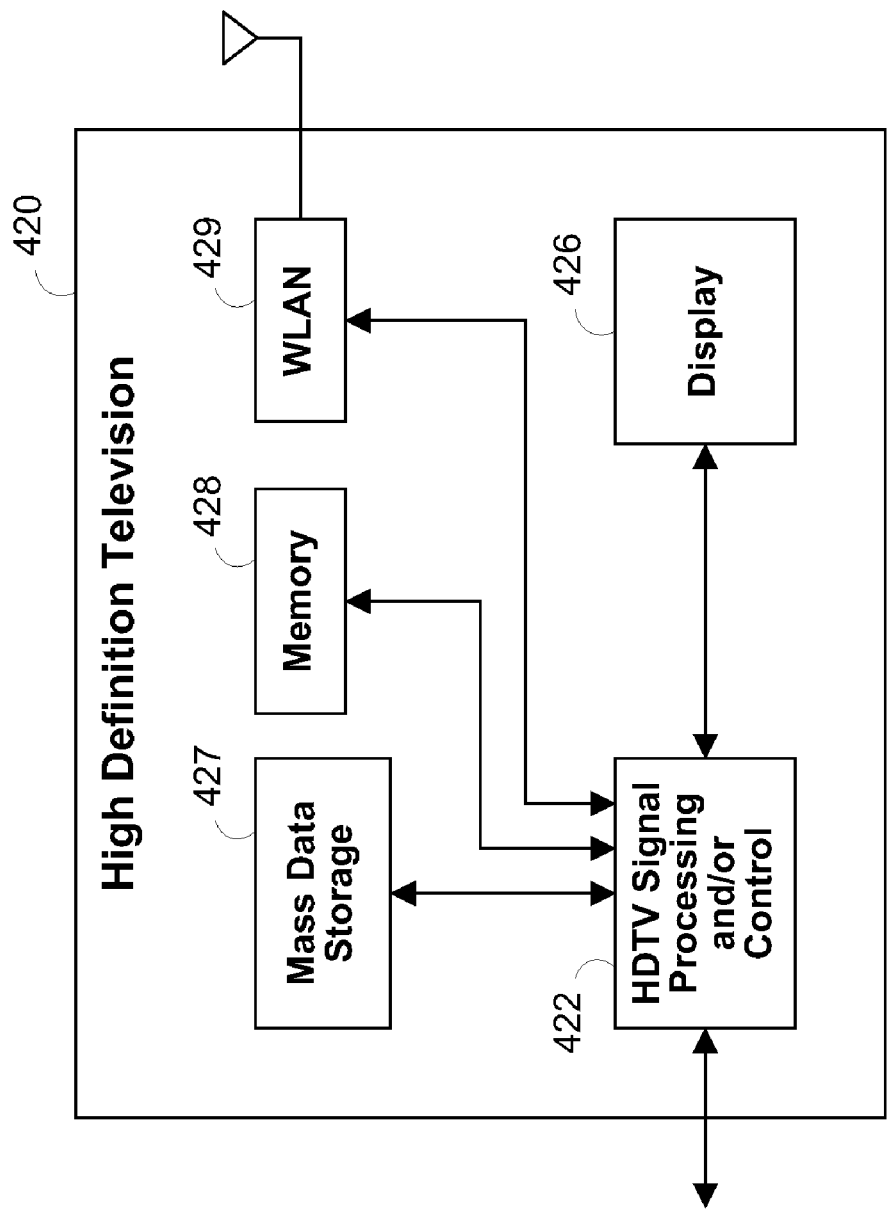
FIG. 6 is a block diagram of an exemplary high definition television that can employ the disclosed technology.

Referring now to FIG. 6, the present invention can be implemented in a high definition television (HDTV) 420. The present invention may implement either or both signal processing and/or control circuits, which are generally identified in FIG. 6 at 422, a WLAN network interface 429 and/or mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices for example hard disk drives and/or DVDs. At least one HDD may have the configuration shown in FIG. 4 and/or at least one DVD may have the configuration shown in FIG. 5. The HDD may be a mini HDD that includes one or more platters having a diameter that is smaller than approximately 1.8". The HDTV 420 may be connected to memory 428 such as RAM, ROM, nonvolatile memory such as flash memory and/or other suitable electronic data storage. The HDTV 420 also may support connections with a WLAN via a WLAN network interface 429.

Figure 7:
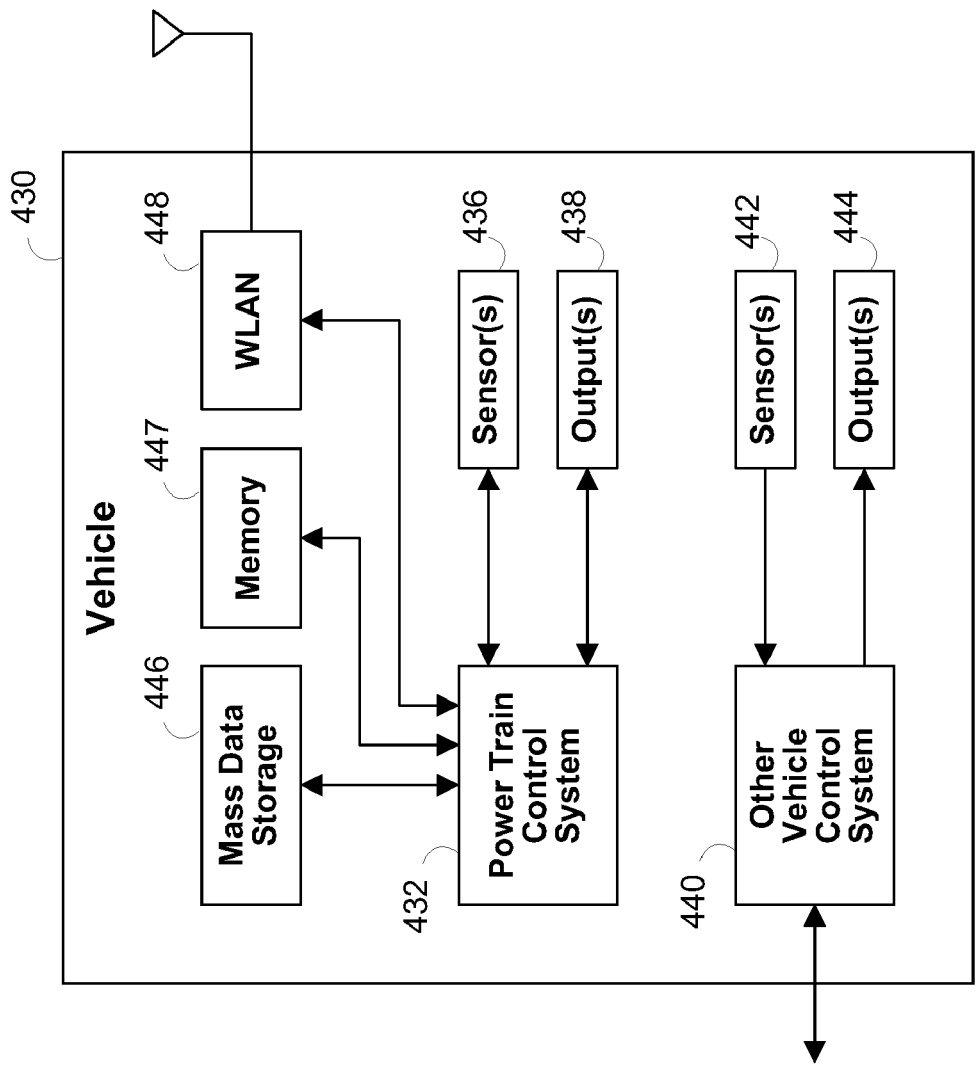
FIG. 7 is a block diagram of an exemplary vehicle that can employ the disclosed technology.

Referring now to FIG. 7, the present invention implements a control system of a vehicle 430, a WLAN network interface 448 and/or mass data storage 446 of the vehicle control system. In some implementations, the present invention may implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, breaking parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives and/or DVDs. At least one HDD may have the configuration shown in FIG. 4 and/or at least one DVD may have the configuration shown in FIG. 5. The HDD may be a mini HDD that includes one or more platters having a diameter that is smaller than approximately 1.8". The powertrain control system 432 may be connected to memory 447 such as RAM, ROM, nonvolatile memory such as flash memory and/or other suitable electronic data storage. The powertrain control system 432 also may support connections with a WLAN via a WLAN network interface 448. The control system 440 may also include mass data storage, memory and/or a WLAN network interface (all not shown).

Figure 8:
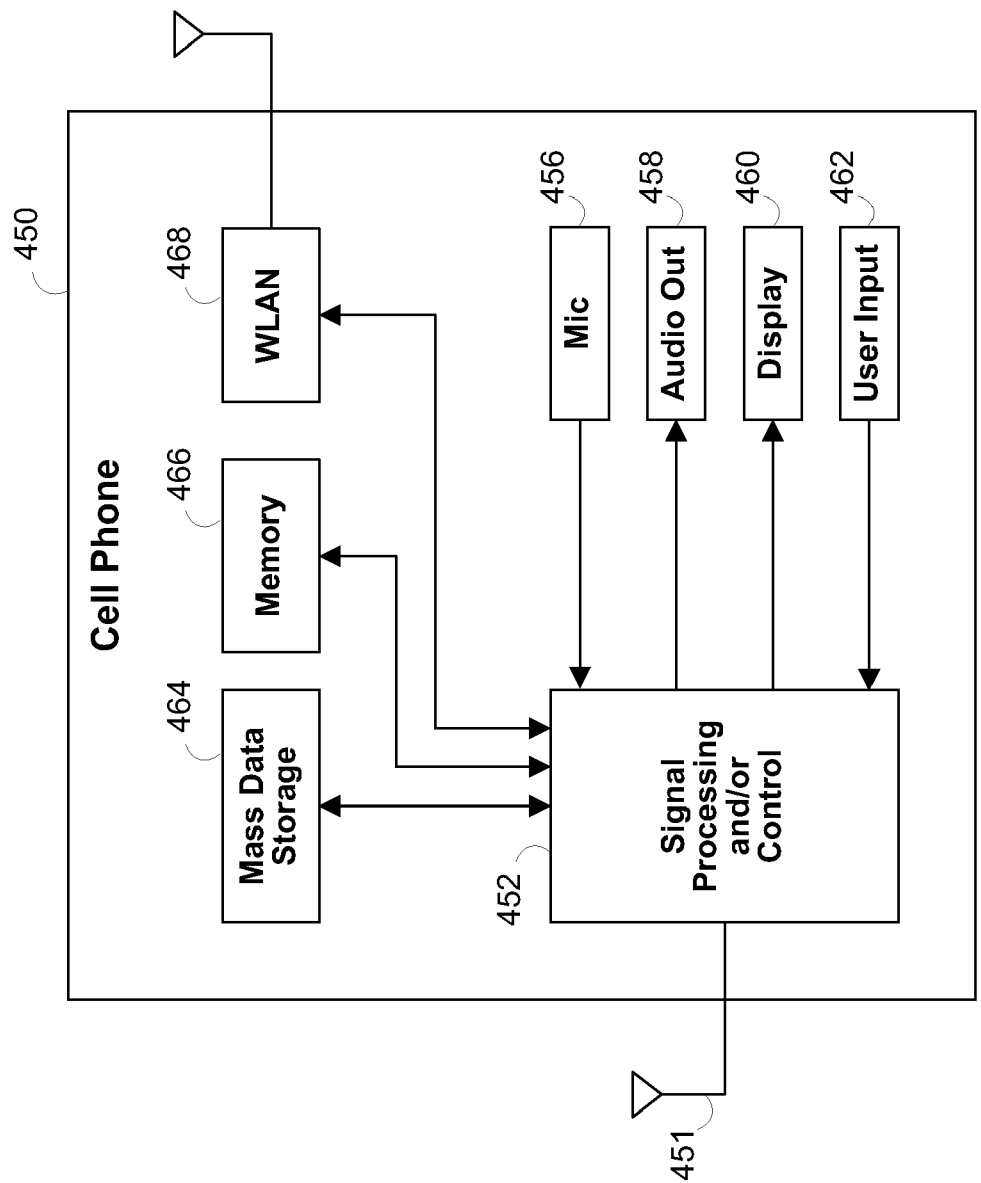
FIG. 8 is a block diagram of an exemplary cell phone that can employ the disclosed technology.

Referring now to FIG. 8, the present invention can be implemented in a cellular phone 450 that may include a cellular antenna 451. The present invention may implement either or both signal processing and/or control circuits, which are generally identified in FIG. 8 at 452, a WLAN network interface 468 and/or mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives and/or DVDs. At least one HDD may have the configuration shown in FIG. 4 and/or at least one DVD may have the configuration shown in FIG. 5. The HDD may be a mini HDD that includes one or more platters having a diameter that is smaller than approximately 1.8". The cellular phone 450 may be connected to memory 466 such as RAM, ROM, nonvolatile memory such as flash memory and/or other suitable electronic data storage. The cellular phone 450 also may support connections with a WLAN via WLAN network interface 468.

Figure 9:
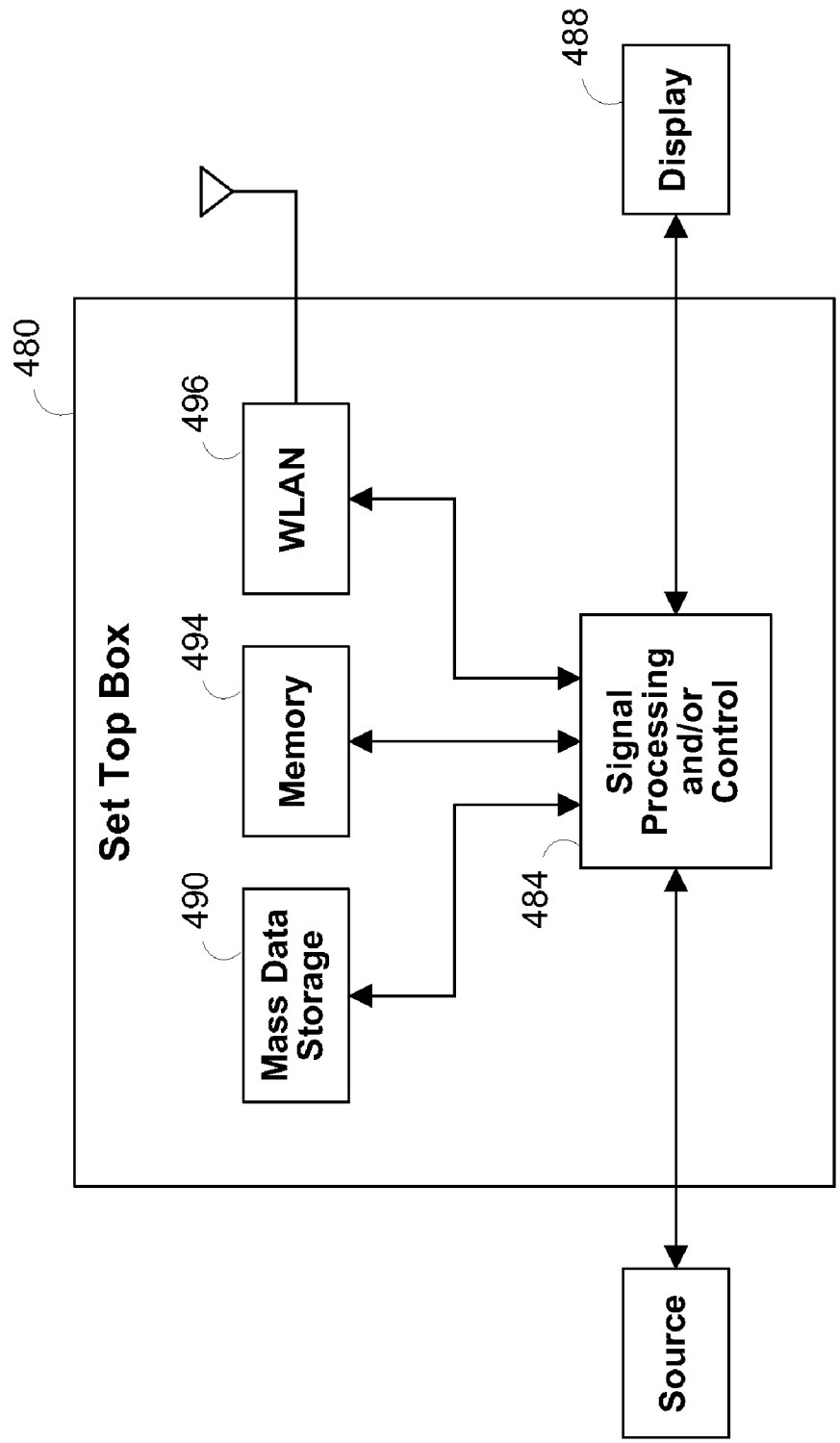
FIG. 9 is a block diagram of an exemplary set top box that can employ the disclosed technology.

Referring now to FIG. 9, the present invention can be implemented in a set top box 480. The present invention may implement either or both signal processing and/or control circuits, which are generally identified in FIG. 9 at 484, a WLAN network interface 496 and/or mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives and/or DVDs. At least one HDD may have the configuration shown in FIG. 4 and/or at least one DVD may have the configuration shown in FIG. 5. The HDD may be a mini HDD that includes one or more platters having a diameter that is smaller than approximately 1.8". The set top box 480 may be connected to memory 494 such as RAM, ROM, nonvolatile memory such as flash memory and/or other suitable electronic data storage. The set top box 480 also may support connections with a WLAN via a WLAN network interface 496.

Figure 10:
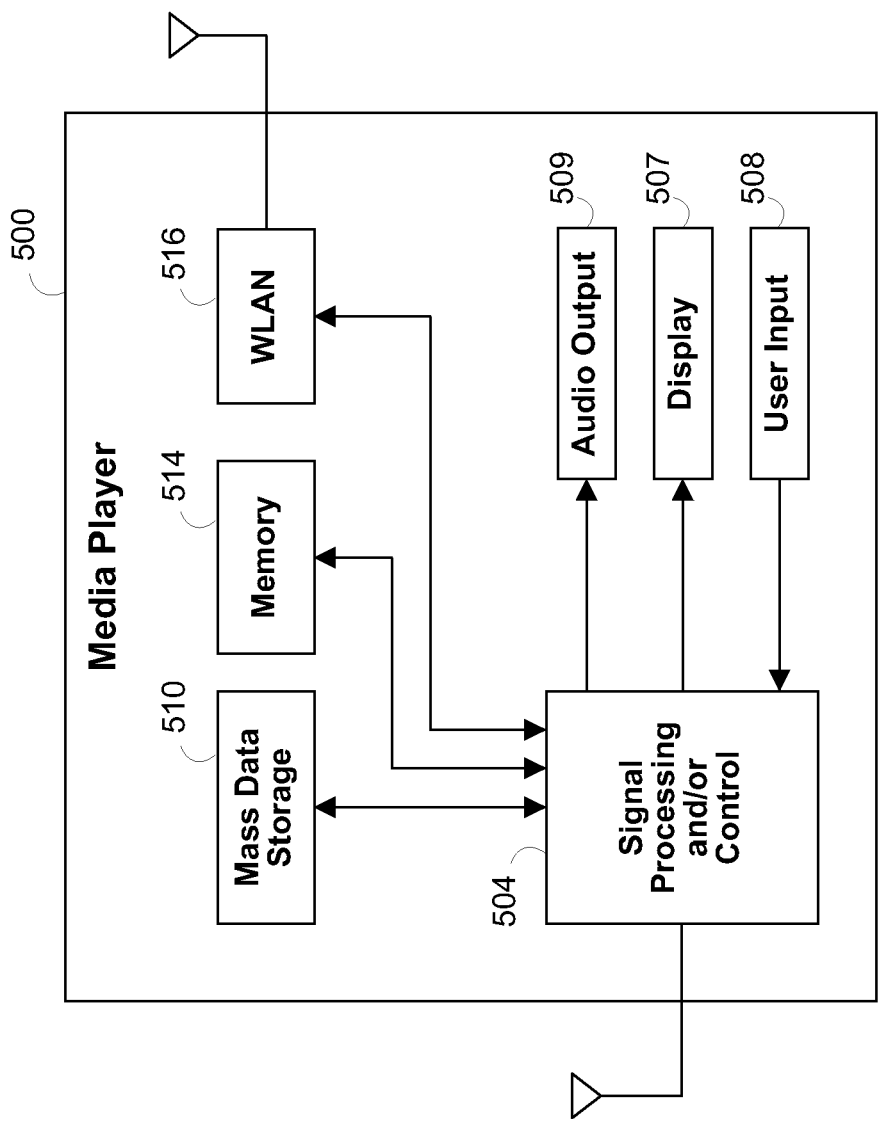
FIG. 10 is a block diagram of an exemplary media player that can employ the disclosed technology.

Referring now to FIG. 10, the present invention can be implemented in a media player 500. The present invention may implement either or both signal processing and/or control circuits, which are generally identified in FIG. 10 at 504, WLAN network interface 516 and/or mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 4 and/or at least one DVD may have the configuration shown in FIG. 5. The HDD may be a mini HDD that includes one or more platters having a diameter that is smaller than approximately 1.8". The media player 500 may be connected to memory 514 such as RAM, ROM, nonvolatile memory such as flash memory and/or other suitable electronic data storage. The media player 500 also may support connections with a WLAN via WLAN network interface 516. Still other implementations in addition to those described above are contemplated.

The foregoing describes systems and methods for adaptively computing a target for a recording channel. Those skilled in the art will appreciate that the invention can be practiced by other than the described embodiments, which are presented for the purpose of illustration rather than of limitation.

What is claimed is:

1. A method of updating a target for a recording channel, wherein the target comprises a sequence of target taps, the method comprising:
computing an error value between an actual response of the recording channel and a desired response, wherein the desired response is based on a current value of the target;
constraining a target tap other than a first target tap in the sequence to a predetermined value; and
adjusting a remainder of the target taps in the sequence in real-time based on the error value.

2. The method of claim 1, wherein adjusting the remainder of the target taps comprises:
adjusting the remainder of the target taps using a linearly-constrained least-mean-square algorithm.

3. The method of claim 1, wherein constraining the target tap comprises:
fixing a last target tap in the sequence to the predetermined value.

4. The method of claim 1, wherein constraining the target tap comprises:
fixing the target tap to a value of one.

5. The method of claim 1, further comprising:
scaling each of the adjusted target taps in the sequence to provide a final target; and
programming the recording channel using the scaled target.

6. The method of claim 1, wherein computing the error value comprises:
receiving a readback signal from the recording channel; and
equalizing the readback signal to obtain the actual response.

7. The method of claim 6, wherein an equalizer operates based on a plurality of equalizer taps, the method further comprising:
adjusting the equalizer taps in real-time based on the error value.

8. The method of claim 1, wherein adjusting the remainder of the target taps comprises:
detecting user information received from the recording channel; and
adjusting the remainder of the target taps based on the detected user information.

9. The method of claim 8, wherein detecting the user information comprises:
processing the user information using a noise-whitening filter; and
interpreting the user information based on a Viterbi algorithm.

10. A read channel apparatus for updating the target in a recording channel, wherein the target comprises a sequence of target taps, the apparatus comprising:
an adaptive equalizer to provide an actual response of the recording channel; and
an adaptive target computation module to adaptively adjust the target taps other than at least one target tap, wherein the at least one tap is not a first target tap in the sequence, and wherein the adaptive target computation module adaptively adjusts the target taps based on the actual response of the recording channel.

11. The apparatus of claim 10, wherein the adaptive target computation module comprises:
a target response computation module that generates a desired channel response.

12. The apparatus of claim 11, wherein the target response computation module computes the desired channel response based on detected user information interpreted from a readback signal.

13. The apparatus of claim 11, further comprising:
a difference module that computes an error value between the desired channel response and the actual response.

14. The apparatus of claim 13, wherein the target computation module further comprises:
a target update module that adaptively adjusts the target taps in real-time based on the error value.

15. The apparatus of claim 13, wherein the adaptive equalizer operates based on a plurality of equalizer taps, and wherein the adaptive equalizer adaptively adjusts the equalizer taps using the error value.

16. The apparatus of claim 10, wherein the adaptive target computation module adaptively adjusts the target taps using a linearly-constrained least-mean square algorithm.

17. The apparatus of claim 10, wherein the adaptive target computation module adjusts all of the target taps in the sequence other than a last target tap.

18. The apparatus of claim 10, wherein the target computation module comprises:
a scaling module that scales each of the adjusted target taps in the sequence to provide a final target for programming into the recording channel.

19. The apparatus of claim 10, wherein the adaptive equalizer computes the actual response based on a readback signal received from the recording channel.

20. A read channel apparatus for a recording channel, the apparatus comprising:
one or more data path modules comprising a noise-whitening-based Viterbi detector, wherein the noise-whitening-based Viterbi detector interprets a readback signal obtained from the recording channel; and
one or more adaptive path modules that operate independently from the data path modules, the adaptive path modules comprising a target computation module for adjusting a target in real-time.

21. The apparatus of claim 20, wherein the target computation module adjusts the target based on the interpreted readback signal.

22. The apparatus of claim 20, wherein the target comprises a sequence of target taps, wherein the target computation module adjusts the target taps other than one of the target taps, and wherein the one of the target taps is not a first target tap in the sequence.

23. The apparatus of claim 20, wherein the data path modules further comprise an equalizer to equalize the readback signal, and wherein the Viterbi detector interprets the equalized feedback signal.

24. The apparatus of claim 20, wherein the adaptive path modules further comprise an adaptive equalizer to compute an actual response of the recording channel.

25. The apparatus of claim 24, wherein the target computation module adjusts the target based on a difference between the actual response and a current desired response, wherein the current desired response is based on a current value of the target.

26. The apparatus of claim 20, wherein the target from the adaptive path modules is loaded onto the data path modules.

27. The apparatus of claim 20, wherein the adaptive path modules further comprise an adaptive equalizer to compute an actual response of the recording channel, wherein the target from the adaptive path modules and the actual response of the recording channel is loaded onto the data path modules.

28. The apparatus of claim 20, wherein the data path modules further comprise a target computation module for adjusting the target in real-time.

29. The apparatus of claim 28, wherein the data path modules further comprise an equalizer to equalize the readback signal.

* * * * *